United States Patent [19]

Rumsey

[11] Patent Number: 4,496,193
[45] Date of Patent: Jan. 29, 1985

[54] VIGILANCE SAFETY CONTROL SYSTEM

[75] Inventor: Steven C. Rumsey, N. Huntingdon, Pa.

[73] Assignee: American Standard Inc., Wilmerding, Pa.

[21] Appl. No.: 419,652

[22] Filed: Sep. 20, 1982

[51] Int. Cl.³ .............................................. B60T 7/14
[52] U.S. Cl. ....................................... 303/19; 303/20
[58] Field of Search ................... 340/530; 307/9, 109; 246/186, 187 R, 167 R; 303/19, 20

[56] References Cited

U.S. PATENT DOCUMENTS 3,246,140 4/1966 Wrege et al. ......................... 303/19
3,778,116 12/1973 Kennedy ............................... 303/19

Primary Examiner—Bruce H. Stoner, Jr.
Assistant Examiner—Alvin Oberley
Attorney, Agent, or Firm—J. B. Sotak

[57] ABSTRACT

A vigilance safety control arrangement for periodically checking the attentiveness of a trainman. The arrangement includes a pair of capacitive charging circuits connectable to a source of voltage and a pair of resistive-capacitive discharging circuits connectable to an application and indication relay. An electrical toggle switch for periodically connecting one of the pair of capacitive charging circuits to the voltage source and one of the pair of capacitive discharging circuits to the application and indication relay for causing a magnet valve to maintain the brakes of the train in their released position.

9 Claims, 2 Drawing Figures

VIGILANCE SAFETY CONTROL SYSTEM

FIELD OF THE INVENTION

This invention relates to a vigilance safety control system and more particularly to an electropneumatic alertness monitoring arrangement for checking the attentiveness of an operator of a moving vehicle by periodically requiring a cycling of an electrical timing network by actuating a reversing switch to prevent the initiation of a penalty braking application by the pneumatic brake control apparatus.

BACKGROUND OF THE INVENTION

It is common practice in railroad and mass and/or rapid transit operations to constantly check the alertness of the locomotive engineer or trainman by requiring him to routinely perform a certain task when the train is moving along its route of travel. In the past, the train operator was required to constantly depress a foot pedal or a push-button switch on a deadman's handle to maintain normal operation. However, the operator is capable of circumventing such a simple safety control device by placing a weight on the foot pedal or by taping the push-button switch to provide a false indication of his watchfulness. Presently, a pneumatic cycling valve is used in railroad applications as a means of requiring the locomotive engineer to periodically acknowledge his attentiveness by alternately activating a foot pedal spool valve device in order to suppress a penalty brake application. The use of a pneumatic cycling spool valve type of vigilance safety control system entails moving parts and O-ring seals which are susceptible to wear and leakage problems. Alternately, an existing locomotive safety control vigilance system utilizes a depressed foot pedal for resetting the vigilance control. This latter control system is quite sophisticated and rather complex and includes a three-stage timing circuit with two drop-out time relays and an air reservoir and choke doing the timing. Thus, the electrical circuitry is somewhat involved and employs a large number of components or elements which is costly to manufacture and expensive to purchase.

OBJECTS OF THE INVENTION

Accordingly, it is an object of this invention to provide a new and improved vigilance safety control system.

A further object of this invention is to provide a unique electropneumatic vigilance monitor system for periodically checking the alertness of a vehicle operator.

Another object of this invention is to provide a novel alertness checking network for monitoring the attentiveness of a locomotive engineer while the train is in motion.

Still a further object of this invention is to provide an improved electropneumatic periodic cycling safety control system which requires a motorman to institute a timely acknowledgement of a warning signal in order to prevent a penalty brake application.

Still another object of this invention is to provide a novel safety control system which periodically checks the alertness of a trainman.

Yet a further object of this invention is to provide a vigilance safety control system for periodically checking the alertness of a train operator comprising, a pair of charging circuits connectable to a source of voltage, a pair of discharging circuits connectable to at least one relay, a reversing switch for selectively and periodically connecting one of said pair of charging circuits to the voltage source and one of said discharging circuits to the relay for causing the energization of a magnet valve to maintain the brakes of the train in their released position.

Yet another object of this invention is to provide an improved electropneumatic vigilance safety control system which is economical in cost, simple in design, easy to manufacture, efficient in service, reliable in operation, and durable in use.

SUMMARY OF THE INVENTION

Briefly, in accordance with the present invention, there is provided a unique safety control system for checking the alertness of an operator of a locomotive. The system includes an electric timing portion and a pneumatic initiating portion. The electric timing portion includes a pair of capacitive charging circuits and a pair of capacitive discharging circuits. An electrical switch having a plurality of front and back contacts for alternately and periodically connecting one of the capacitive charging circuits to a source of d.c. voltages and for alternately and periodically connecting one of the capacitive discharging circuits to an indication relay and an application relay. The indication relay includes a back contact which is connected to an initial warning lamp to forewarn the operator to toggle the electrical switch after the expiration of a predetermined time period. The operating relay includes a front contact which is connected to the coil of a magnet valve. The magnet valve is pneumatically connected to a brake application valve and a warning whistle. Normally, if the operator timely acknowledges the warning lamp by toggling the electrical reversing switch, the application relay will maintain the coil of the magnet valve energized over its front contact so that the brakes are released. However, if the operator fails to timely acknowledge the warning lamp, the front contact of the application relay opens and deenergizes the coil of the magnet valve which causes the brake application valve to be connected to the whistle. The sounding of the whistle provides a final warning to the operator that he must immediately toggle the electrical switch to prevent a penalty brake application.

BRIEF DESCRIPTION OF THE DRAWINGS

The above objects and other attendant features and advantages of the subject invention will become more fully evident from the foregoing detailed description when considered in conjunction with the accompanying drawings, wherein.

DETAILED DESCRIPTION OF THE INVENTION

Figure 1:
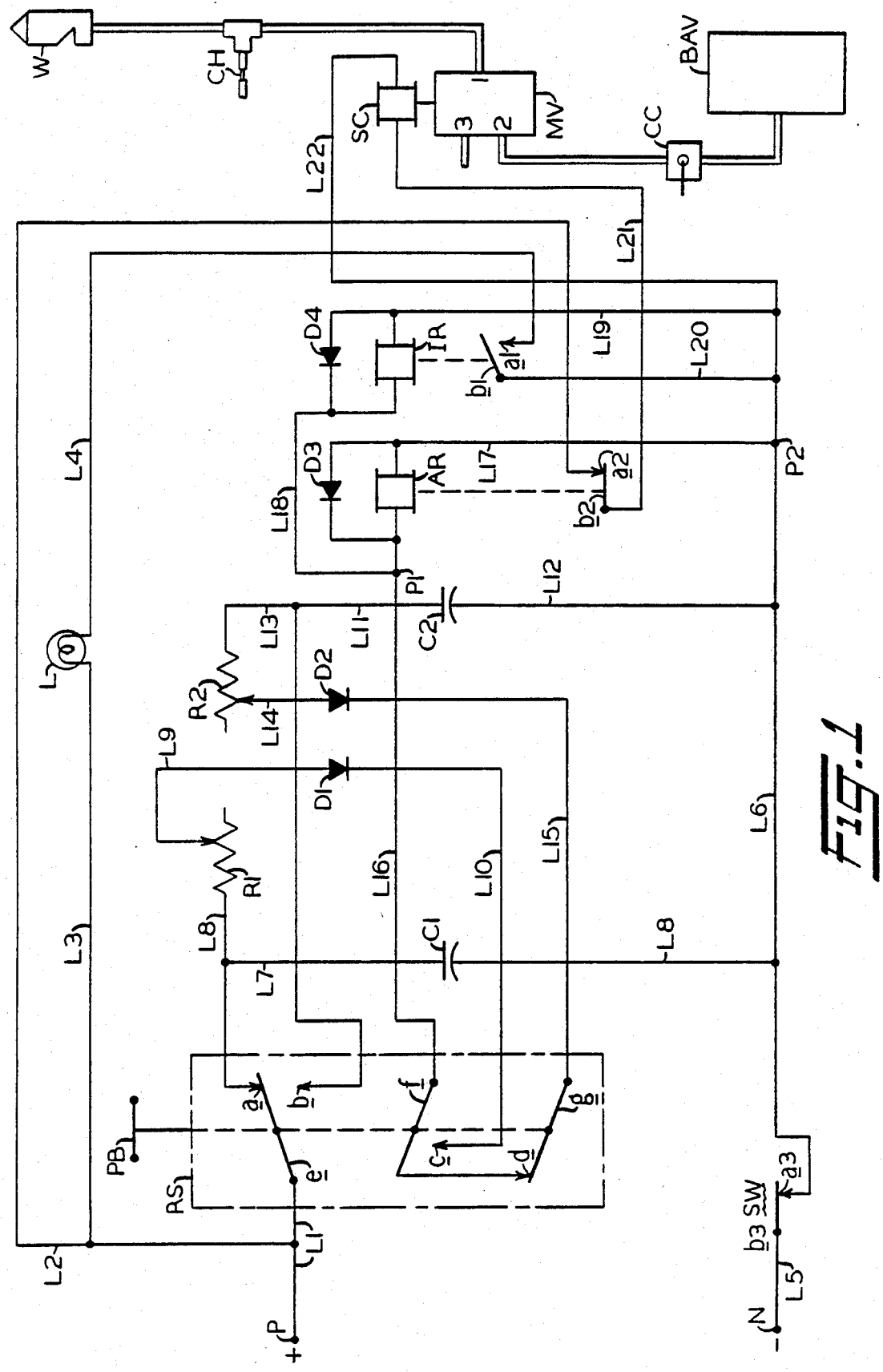
FIG. 1 is a schematic circuit diagram of a preferred embodiment of the electropneumatic vigilance safety control system of the present invention.

Referring now to the drawings, and in particular to FIG. 1, there is shown a vigilance safety control system which may be provided in the cab of a railway locomotive or lead transit vehicle for monitoring the alertness of an engineer or operator. As shown, the system includes an electric timing circuit portion and a pneumatic operating portion. A source of electrical power, such as, a direct current power supply which includes a pair of positive (+) and negative (−) terminals. The positive terminal (+) is connected to input terminal P while the negative terminal (−) is connected to input terminal N. The positive terminal P is connected to movable contact e of a snap-action reversing switch RS via lead L1. The positive terminal P is connected to front contact a2 of an application relay AR via lead L2 and is also connected to one end of indication lamp L via lead L3 while the other end of lamp L is connected to back contact a1 of an indication relay IR via lead L4. The negative terminal N is connected to movable contact b of actuating or ON-OFF switch SW via lead L5. The switch SW includes a fixed contact a3 which is connected to a common lead L6.

As shown, the reversing switch RS includes a pair of front contacts a and d as well as a pair of back contacts b and c. The movable contact e makes and breaks contact with the respective fixed contacts a and b which form a single-pole, double-throw switch while a pair of movable contacts f and g makes and breaks contact with the contacts c and d, respectively, which form a double-pole, double-throw switch. A manually operable member, such as, a push-pull button PB is mechanically linked to the three movable contacts e, f and g. The front contact a3 of switch SW is connected to the upper plate of a first charging capacitor C1 via lead L7 while the lower plate of capacitor C1 is connected to common lead L6 via lead L8. The front contact a of switch RS is also connected to one end of a first variable timing resistor or potentiometer R1 while the other or tapped end of resistor R1 is connected to the anode electrode of a blocking diode D1 via lead L9. The cathode electrode of diode D1 is connected to the back contact c via lead L10. The back contact b of switch RS is connected to the upper plate of a second charging capacitor C2 via lead L11 while the lower plate of capacitor C2 is connected to common lead L6 via lead L12. The back contact b of switch RS is also connected to one end of a second variable timing resistor or potentiometer R2 via lead L13 while the other or tapped end of resistor R2 is connected to the anode electrode of blocking diode D2 via lead L14. The cathode electrode of diode D2 is connected to the movable contact g of switch RS via lead L15.

It will be seen that the movable contacts f and g function in a make-before-break manner in regard to back contact c and front contact d. Thus, when the push-button PB is depressed, the movable contact f will engage back contact a before movable contact g will disengage front contact d and conversely, when the button is pulled, the movable contact g will engage front contact d before movable contact f will disengage the back contact c.

As shown, the movable contact f is connected to one end of the coil of the electromagnetic application relay AR via lead L16 while the other end of the electromagnetic coil is connected to the common lead L6 via lead L17. A surge suppressing diode D3 is connected across the coil of relay AR for subduing inductive transient voltage. It will be seen that one end of the coil of the electromagnetic indication relay IR is connected to lead L16 via lead L18 while the other end of electromagnetic coil IR is connected to the common lead L6 via lead L19. A surge suppressing diode D4 is connected in parallel with the electromagnetic coil IR to subdue inductive transient surges. The electromagnetic relay IR includes a movable heel contact b1 which is connected to the common lead L6 via lead L20 while the electromagnetic relay AR includes a movable heel contact b2 which is connected to one end of a solenoid coil SC of a magnet valve MV via lead L21. The other end of the solenoid valve coil SC is connected to the common lead via lead L22. In practice, the drop-out characteristic of the application relay AR is lower than that of the indication relay IR so that the heel contact b1 of the indication relay IR will release first as the voltage decreases.

The magnet valve MV contains an upper valve, a lower valve, and a valve spring. The magnet coil housing contains a magnet coil, a magnet core, an armature, and an armature stem. The upper valve is adapted to interconnect port 1 which leads to a tee connection which, in turn, is connected to an exhaust choke CH and to warning whistle W. The port 3 of valve MV leads to atmosphere. The lower valve is adapted to interconnect port 1 to port 2 which leads to the sealed open cock CC and the brake application valve BAV.

Figure 2:
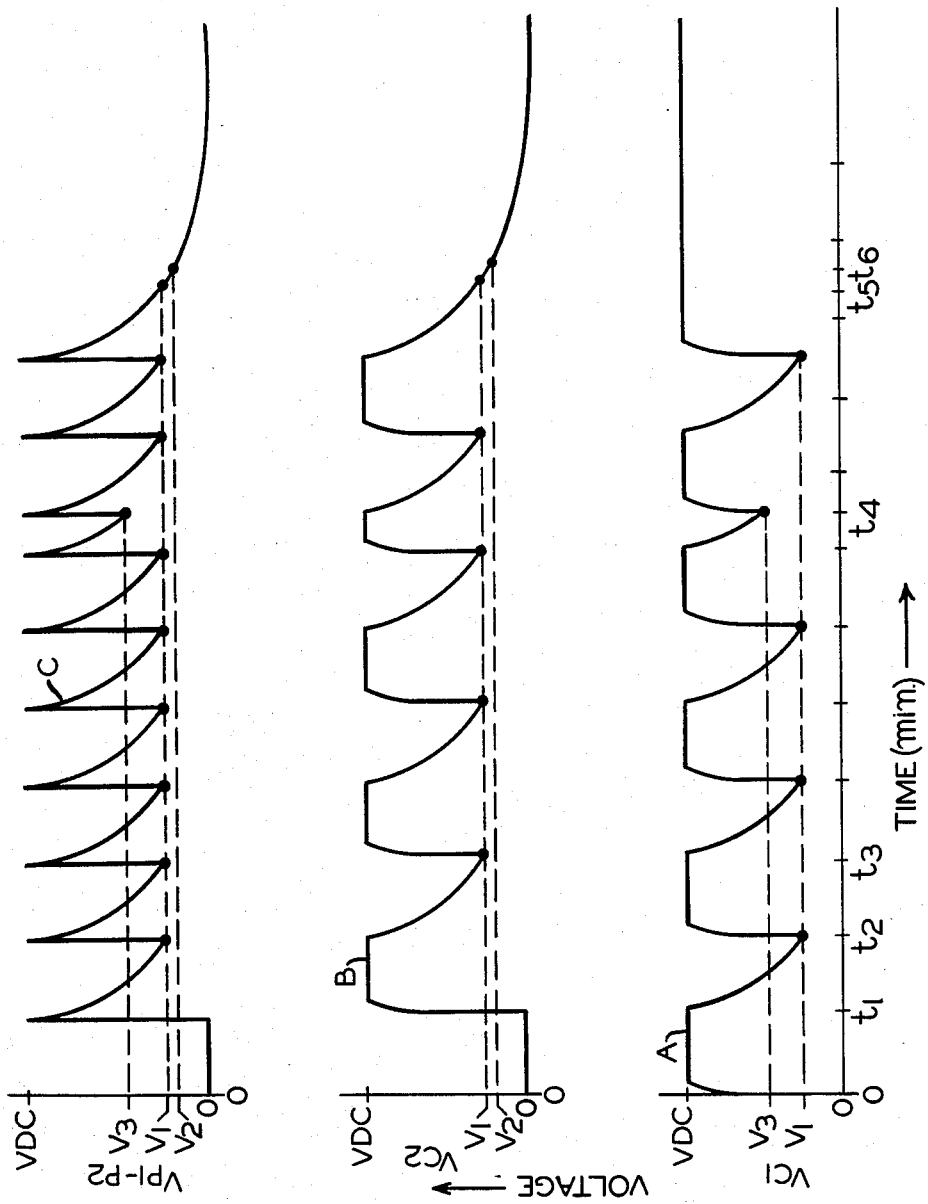
FIG. 2 is a graphic representation showing the voltage curves at various points in the circuit of FIG. 1.

In describing the operation of the present invention, it will be assumed that the braking system is intact, that the contacts of the reversing switch RS and relays AR and IR are in the positions as shown in FIG. 1, and that the power switch SW has just been closed which is represented by time zero as shown in FIG. 2. In this condition, the capacitor C1 begins to charge through a circuit extending from the positive terminal P, through lead L1, over contacts e and a of switch RS, through lead L7, to capacitor C1, through leads L8 and L6, over contacts a3 and b3 of switch SW, through lead L5 to the negative terminal N. The capacitor C1 charges rapidly to the source voltage $V_{DC}$ due to the short time constant as shown by curve A in FIG. 2. The relays AR and IR will be deenergized at this time since the voltage across capacitor C2 is at zero volts as shown by curve B in FIG. 2. Let us assume that at time $t_1$, the train is ready to get underway so that the push-button PB is depressed by the trainman. The depression toggles the snap-action switch RS so that contacts a and d become opened by heel contacts e and g, respectively, while contacts b and c become closed by heel contacts e and f, respectively. It will be seen that the closing of contact c establishes an energizing circuit path from capacitor C1 to the coils of the application and indication relays AR and IR. That is, the voltage charge on the capacitor C1 is conveyed to relays AR and IR over a circuit path extending from its upper plate, through leads L7 and L8, resistor R1, lead L9, diode D1, lead L10, over closed contacts c and f, through lead L16, to the coil of relay AR, and also through lead L18 to the coil of relay IR, and from the coil of relay AR, through lead L17 and also from the coil of relay IR, through lead L19, through common lead L6, through lead L8 to the lower plate of capacitor C1. The energization of relays AR and IR results in the picking up of their heel contacts b2 and b1, respectively. The pickup of heel contact b2 of relay AR closes front contact a2 which energizes the solenoid coil SC of magnet valve MV over a circuit path extending from positive terminal P, through leads L1 and L2, over contacts a and b of relay AR, through lead L21, to coil SC, through leads L22 and L6, over contacts b3 and a3 of switch SW, through lead L5 to the negative terminal N. Thus, the energized coil SC causes the armature and stem to open the upper valve to close the lower valve so that fluid pressure from the brake application valve BAV is cut off from the whistle W. The pickup of the heel contact b1 of relay IR opens its back contact a1 so that the lamp L indication circuit is interrupted.

Let us now retrogress to the initial toggling of the snap-acting reversing switch RS. It will be seen that the closing of the fixed contact b by the heel contact e establishes a charging circuit for capacitor C2. The charging circuit extends from positive terminal P, through line L1, over closed contacts e and b, through lead L11, to capacitor C2 through lead L12 and L6, over contacts a3 and b3 of switch SW, through lead L5 to the negative terminal N. Thus, the capacitor C2 rapidly charges to the level of the d.c. voltage source $V_{DC}$ due to the short time constant of the charging circuit. The voltage across capacitor C2 rises to the source voltage $V_{DC}$ as shown by curves B in FIG. 2.

Further, it will be seen that at the beginning at time $t_1$, the voltage across capacitor C1 starts to decay as noted by the exponential decline of curve A in FIG. 2. The slow rate of discharge is due to the long RC time constant exhibited by the discharge circuit.

In viewing FIG. 2, it will be seen that the voltage $V_{C1}$ across capacitor C1 continues to decay and at time $t_2$, the voltage across points P1-P2 reaches the drop-out level of the indication relay IR so that heel contact b1 drops and engages the back contact a1. The closing of contacts a1 and b1 of relay IR causes the illumination of warning lamp L to apprise the trainman that it is time to cycle the reversing switch RS. Thus, if the trainman toggles the actuating button PB, the reversing switch will resume the position as shown in FIG. 1. Now, the voltage of capacitor C2 will be connected across points P1 and P2 so that the indication relay IR will again be energized and the opening of its contacts a1 and b1 will extinguish the lamp L. The capacitor C1 begins to recharge while the capacitor C2 begins to discharge. Again, at time $t_3$, the indication relay IR is released and the closing of its contacts a1 and b1 illuminate the warning lamp L to notify the trainman to recycle to the switch RS.

As shown in FIG. 2, the capacitors C1 and C2 will alternately charge and discharge as long as the trainman is alert and timely recycles the reversing switch RS. It will be appreciated that the trainman may recycle the system at any time prior to the illumination of the lamp L. For example, at time $t_4$, the capacitor C1 is furnishing the voltage to the relays AR and IR, and if the trainman toggles the switch RS, then the capacitor C2 will begin to supply the voltage to the relays AR and IR.

Let us now assume that the capacitor C2 is supplying the power to relays AR and IR and the warning lamp L is lit at time $t_5$, but that the trainman fails for some reason to reverse the switch RS by depressing the pushbutton PB. Thus, the capacitor C2 continues to discharge and at time $t_6$, the voltage across points P1 and P2 as shown by curve C, drops to a level at which the application relay AR drops away to open its contacts a2 and b2. The opening of contacts a and b of relay AR causes the denergization of the solenoid coil SC of the magnet valve MV. The spring of the magnet valve MV shifts the upper and lower valves so that air flows from the brake application valve BAV to port 2 and, in turn, to port 1 to cause the warning whistle W to blow. If the trainman fails to acknowledge this final warning, by reversing the switch RS within a given period of time, the exhausting brake application valve BAV will initiate a penalty brake application.

Upon resumption of normal operation, the vigilance safety control system will be restarted after the first cycling of the reversing switch RS and will again function in the same manner as described above.

It will be appreciated that various changes and variations may be made by those skilled in the art without departing from the spirit and scope of the subject invention. Therefore, it will be understood that certain modifications, ramifications, and equivalents will be readily apparent to persons familiar with the art, and accordingly, it will be appreciated that the present invention should not be limited to the exact embodiment shown and described herein but should be accorded the metes and bounds of the appended claims.

Having thus described the invention, what I claim as new and desire to secure by Letters Patent, is:

1. A vigilance safety control system for periodically checking the alertness of a train operator comprising, a pair of charging circuits connectable to a source of voltage, a pair of discharging circuits connectable to a first relay, a reversing switch for selectively and periodically connecting one of said pair of charging circuits to the voltage source and one of said pair of discharging circuits to said first relay for causing a magnet valve to maintain the brakes of the train in their released position, and said reversing switch connects one of said pair of discharging circuits to a second relay which controls a warning device to alert the train operator to shift said reversing switch.

2. The vigilance safety control system as defined in claim 1, wherein each of said charging circuits includes a capacitive element.

3. The vigilance safety control system as defined in claim 1, wherein said first relay includes a front contact which completes a circuit from the voltage source to said magnet valve.

4. The vigilance safety control system as defined in claim 1, wherein said reversing switch includes a single-pole double-throw switch having a front contact connected to one of said pair of charging circuits and having a back contact connected to the other of said pair of charging circuits.

5. The vigilance safety control system as defined in claim 1, wherein said reversing switch includes a double-pole double-throw switch having a front contact connected to one of said discharging circuits and having a back contact connected to the other of said pair of discharging circuits.

6. The vigilance safety control switch as defined in claim 1, wherein said magnet valve is connected to a whistle.

7. The vigilance safety control system as defined in claim 6, wherein said magnet valve is connected to a brake application valve.

8. The vigilance safety control system as defined in claim 6, wherein each of said discharging circuits includes a series connected resistor and diode.

9. The vigilance safety control system as defined in claim 1, wherein said warning device is a lamp.

* * * * *